April 1, 1969 R. P. BARTHOL 3,436,076
PSYCHOLOGICAL TRAINING DEVICE FOR A SPORT
Filed Oct. 18, 1965

INVENTOR.
RICHARD P. BARTHOL
BY
Herzig, Walsh and Blackham
ATTORNEYS

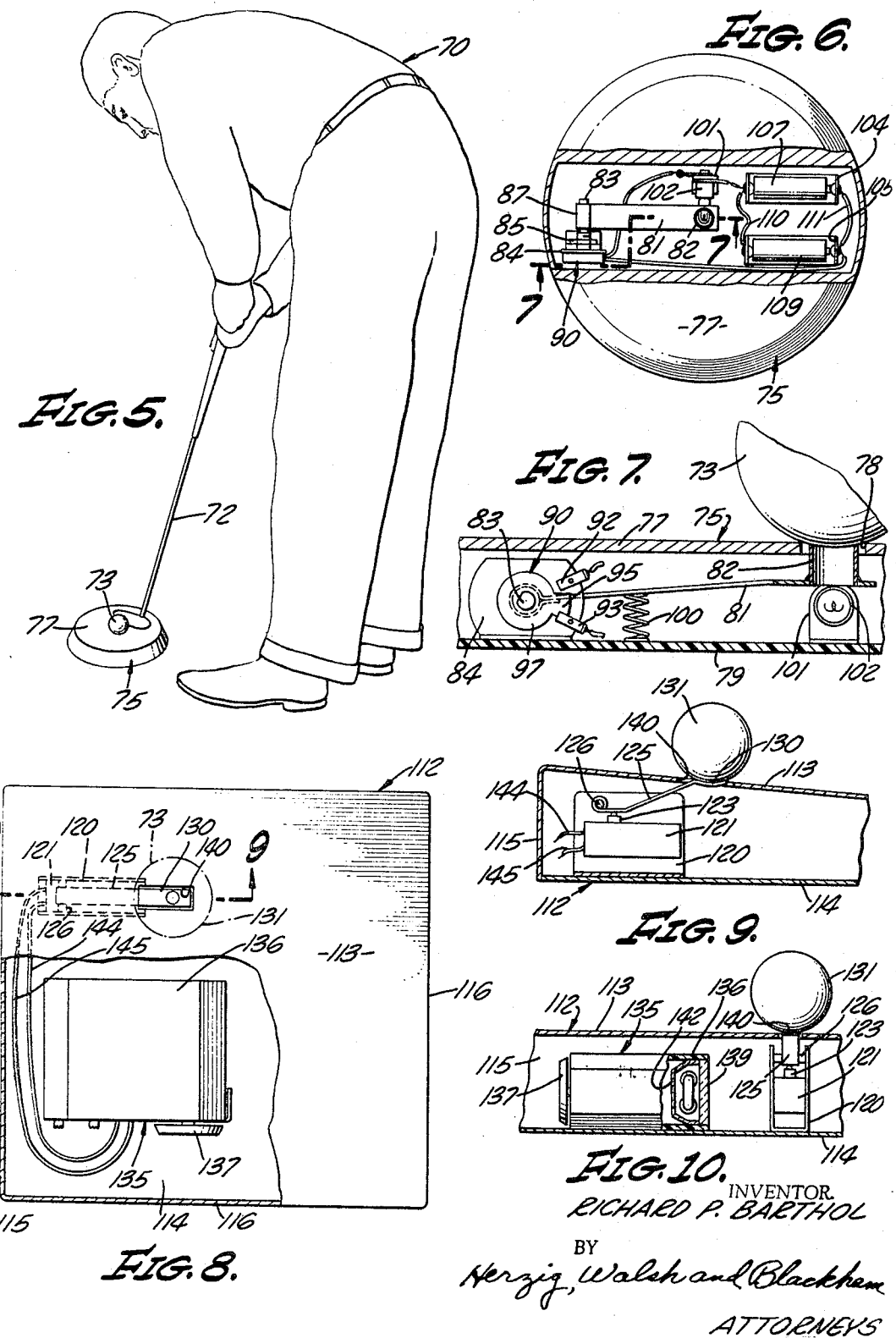

3,436,076
PSYCHOLOGICAL TRAINING DEVICE FOR
A SPORT
Richard P. Barthol, 13141 Addison St.,
Sherman Oaks, Calif. 91403
Filed Oct. 18, 1965, Ser. No. 496,984
Int. Cl. A63b 69/00
U.S. Cl. 273—26        4 Claims

ABSTRACT OF THE DISCLOSURE

The invention is a device for the purpose of assisting and training an individual in any sport wherein a ball is contacted by a playing implement. In nearly all sports of this type it is imperative that the player concentrate on keeping his eye on the ball. The invention provides a means for providing for a signal preferably by way of a flash of light at the time of impact of the implement with the ball and at that position. The signal by way of a flash of light reinforces the player's capability and will to concentrate on keeping his eye one the ball at the time of impact and thereby his ability improves.

---

This invention relates to a basic concept in the field of training devices calculated to train an individual in a particular act which is calculated and designed to produce a particular result. The invention is described herein in detail in relation to sports, including baseball, tennis, and golf, although the invention is adaptable in other fields. In these particular sports, it is a primary consideration that the player "keep his eye on the ball," particularly at the time of impact with an instrument such as a bat. When a player strikes a ball successfully, it is in part because he had his eye on the ball at the time of impact and thereby achieves a successful result and a feeling of satisfaction. The principle on which this invention is based is that of reinforcing this feeling of achievement an satisfaction by tangible means. A cardinal principle in baseball, for example, is that the hitter keep his eye on the ball although every hitter knows that most are unable to behave that way consistently. It has been demonstrated beyond question that cats, chickens, porpoises, and people can be trained by reinforcing or rewarding the desired act. A flashing light can be used as an effective reinforcer although it is within the realm of the invention that other means could be used.

Particular embodiments of the invention will all be described herein in detail, embodiments including that of a baseball bat with a reinforcing light in it, and golf tee or stand with a light to be flashed when the ball is struck.

In accordance with the foregoing, it is the primary object of the invention to provide means for utilizing and implementing the psychological principle that human beings can be trained in a desired direction by reinforcing or rewarding a particular act which is an act contributing to the end or result desired.

Another more specific object is to implement the foregoing object in connection with an instrument or implement used in sports for striking a ball by way of causing an indication such as a flashing light which the player sees if he is looking in the correct direction at a particular time such as the time of impact of the implement against the ball.

A correlated object is to effectuate the preceding object by way of providing for a flashing light in a baseball bat or in a golf tee which will produce a flash of light at the time of impact of a bat or club against the ball.

As indicated, the primary object of the invention is to implement and utilize the psychological principle stated. The specific embodiments of the invention illustrate typical means of implementing and utilizing the principle although it is possible to implement and utilize the principle in many different ways all within the realm and scope of the invention.

Further objects and additional advantages of the invention will become apparent from the following detailed description and annexed drawings, wherein:

FIG. 5 is a pictorial view of the invention utilized in the game of golf;

FIG. 6 is a top broken away view of the golf tee or stand of FIG. 5;

FIG. 7 is a sectional view taken along the line 7—7 of FIG. 6;

FIG. 8 is a partly broken away view of a modified form of the invention;

FIG. 9 is a sectional view taken along the line 9—9 of FIG. 8; and

FIG. 10 is a side view of the device of FIG. 8 partly broken away.

Figure 1:
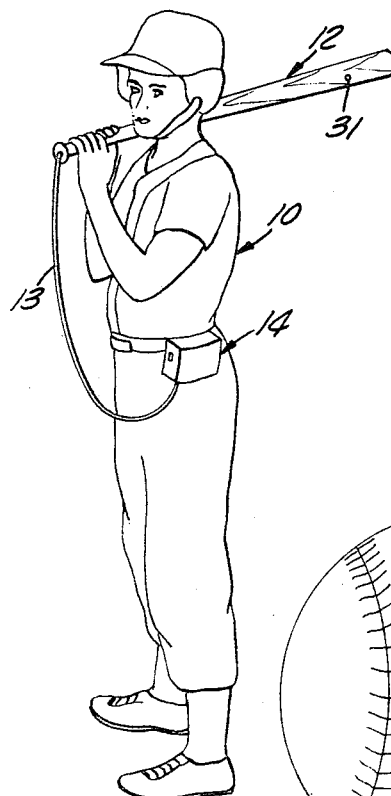
FIG. 1 is a pictorial view of the invention as applied to a baseball batter and bat.
Figure 2:
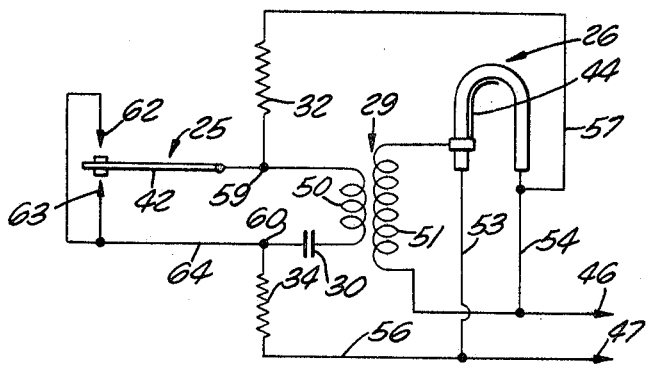
FIG. 2 is a schematic wiring diagram of a circuit that may be used to flash a light in the bat.
Figure 3:
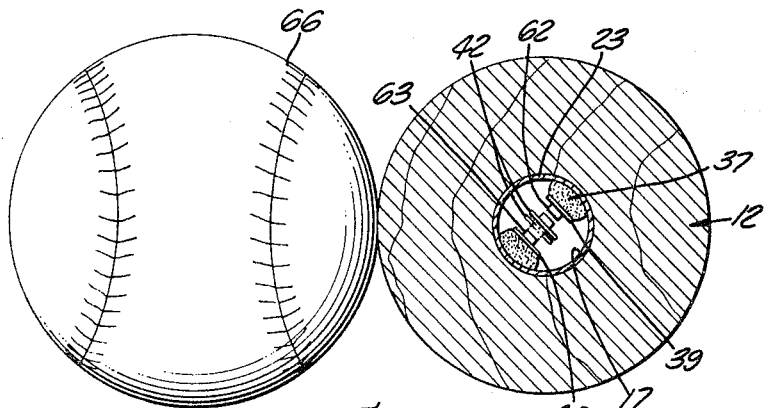
FIG. 3 is a cross-sectional view taken through the bat while the bat is in contact with a baseball.
Figure 4:
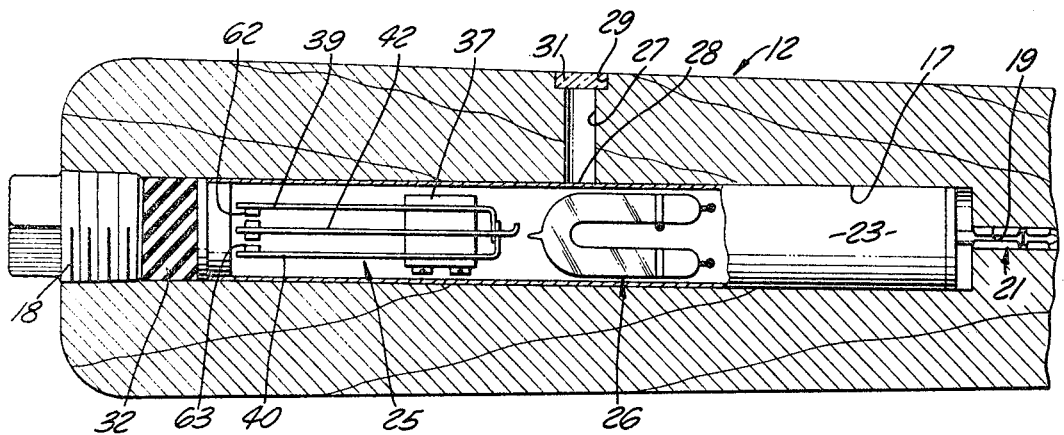
FIG. 4 is a cross-sectional view of a part of the bat.

Referring now in more detail to FIGS. 1, 2, 3 and 4 of the drawings, numeral 10 designates a baseball player having a bat on his shoulder. One form of the invention is embodied in the bat 12. Extending from the handle of the bat is an electrical cable 13 connected to an electrical component 14 which may include a battery power supply. FIG. 2 indicates schematically a wiring diagram and flashtube that may be used, and FIG. 4 is a cross-sectional view of a part of the bat showing the components that are housed therein. The bat has a longitudinal bore 17, the end of which may be closed by screw plug 18. Connected to the bore 17 is a bore 19 of smaller diameter having in it an electrical coupling of the sleeve and pin type, as designated at 21, for making connection to the electrical cable 13 from the components within the bat.

The components within the bat may preferably be housed within a suitable cylindrical housing 23 in the bore 17. These components include an electrical impact switch 25 and a flashtube of U-shape 26 which may be of a standard commercial make such as tubes of this type made by General Electric Company.

The bat 12 has a transverse bore 27 extending from opening 28 in housing 23 adjacent to the flashtube 26. In the end of the bore 27 is a counterbore 29 having in it a glass disc 31. This may be seen in the bat 12 in FIG. 1. As will be described, at the moment of impact of a ball against the bat, as shown in FIG. 3, the flashtube 26 will momentarily flash a light, and if the batter is looking at the area 31, he will be reinforced by seeing the flash. A plug of suitable material such as insulating material 32 may be provided in the end of the bore 17 adjacent to the plug 18.

The impact switch 25 as shown is in the form of a relay capable of responding to inertia effects resulting from impact of the ball against the bat. The circuit includes a transformer 29, a capacitor 30 and resistors 32 and 34. These components are shown in the circuit diagram, FIG. 2. Preferably, they are also included in the housing 23 in the bat although they could be positioned externally in the box or carrier 14.

The impact switch or relay 25 is of the single-pole double-throw type having an insulating mounting 37 carrying contact blades 39 and 40 having contacts cooperating with contacts on a movable blade 42 also carried by the member 37.

The flashtube is of a known type being an arc tube with an electrode sealed therein. The arc chamber is normally filled with gas such as xenon gas and ordinarily has a trigger electrode on an external wall such as designated at 44 in FIG. 2. In the circuit of FIG. 2, numerals 46 and 47 designate electrical connections to a suitable power supply that may be carried in the box or canister 14. The transformer 29 has a primary winding 50 and secondary winding 51. The electrodes in the flashtube are connected to the power supply by way of leads 53 and 54. The primary winding is connected to the power supply by way of the lead 56, resistor 34, capacitor 30, primary winding 50, resistor 32, and leads 57 and 54. The impact switch 25 is connected to terminals 59 and 60 which are connected to the transformer primary winding 50 with the capacitor 30 in the circuit. The movable blade 42 connects to terminal 59. The two fixed contacts 62 and 63 are connected together and to the terminal 60 by lead 64.

FIG. 3 shows a ball 66 at the time of impact with the bat 12. The switch 25 as stated is an impact switch. The inertia of blade 42 may cause it to contact either one of the contacts 62 or 63 at the time of impact of the ball. Before impact, the capacitor 30 is charged through the circuit, as described above. At the time of impact and actuation of the impact switch, the capacitor 40 discharges through the transformer winding 50. Discharge is at the proper voltage so as to energize the secondary winding 51 of the transformer sufficiently for triggering the electrode 44 causing ionization of the gas in the flashtube making it conductive causing a very quick but brilliant flash of light. The voltage generated by winding 51 is sufficient for this purpose. The resistors 32 and 34 provide sufficient impedance to limit the charging rate of the energy storage capacitor 30 and allows the flashtube to deionize and extinguish after the flash.

From the foregoing, those skilled in the art will readily understand the nature of the invention and its operation. When the batter, as shown in FIG. 1, swings and strikes the ball as shown in FIG. 3, the impact will produce a momentary brilliant flash of light visible through the glass disc or panel 31. If the batter is looking at this spot at the time, it will indicate that he is keeping his eye on the ball and will make a good hit. He will know that he was looking in the right direction for achieving a satisfying result; his seeing the flash of light will act as a reinforcement of his success in keeping his eye on the ball and it will reinforce the satisfaction derived therefrom. In other words, the flash of light will act as a reinforcing or rewarding effect which will train the batter effectively in the habit of keeping his eye on the ball.

Having reference to FIGS. 5, 6 and 7 of the drawings, these figures show a modified form of the invention applied to the game of golf. Numeral 70 designates a golfer holding a club 72 adjacent to a golf ball 73 on a stand or tee 75 which is shown more in detail in the sectional views, FIGS. 6 and 7. The stand 75 is circular having a top 77 with an opening 78 in it and a bottom 79. Mounted within the stand or tee 75 is a rotatable blade 81 having a section of tube 82 at its end which normally extends into the hole or aperture 78 and serves as a tee for supporting the golf ball. The blade 81 is mounted on a shaft 83 supported by a bracket 84 and nut 85. The end part 87 of blade 81 is wrapped around the shaft 83, as shown, and secured to it. Supported by the bracket 84 is a switch or contacting device 90 including fixed contacts or blades 92 and 93 spaced apart and cooperating with a contact finger 95 on a disc 97 that rotates with shaft 83. The blade 81 is normally biased into the position shown in FIG. 7 by a coil spring 100.

Numeral 101 designates a support bracket for a lamp socket 102 adapted to receive a miniature bulb. Numerals 104 and 105 are support brackets on the bottom 79 of the stand 75 for supporting miniature batteries 107 and 109 connected by leads 110 and 111. The device is wired so that a circuit may be completed for energizing the bulb and producing a flash of light when either one of the contacts 92 or 93 is engaged.

From the foregoing those skilled in the art will readily understand the nature and operation of this form of the invention. When the golfer strikes the ball 73, at the time of impact it will disengage from contact with the holder or tee 82. This may allow the blade 81 to be moved upwardly so that contact blade 95 engages contact 91, or the ball 73 may be forced downwardly so that blade 81 moves against spring 100 to bring blade 95 into engagement with contact 93. The circuit will be closed only momentarily, in either event producing a flash of light which reinforces and rewards the player's act of looking at the ball at the time of impact. The socket 102 is adjacent to the opening 78 and being within the stand 75, the flash of light is visible only if the golfer is looking at the ball at the time of impact. In this respect, this embodiment of the invention operates similarly to the previous embodiment.

FIGS. 8, 9 and 10 of the drawings show another slightly modified form of the invention. In this form of the invention, a component is included which is a timing device or flasher adjustment for adjusting the time duration of the flash. In this form of the invention, there is provided a rectangular stand, as designated at 112, having a slanting top 113, and having a bottom 114, and having a front end wall 115 and a rear end wall 116. Mounted in the stand is a U-shaped bracket 120 carrying a microswitch 121 having an operating stem 123. Numeral 125 designates a triggering lever pivotally mounted on the shaft 126. In the top 113 of the stand is a hole or aperture 132. At the end of the lever 125 is a curved holding finger 130 for holding the golf ball 131 in a position to be hit. The triggering lever 125 engages the stem of the microswitch 121.

Numeral 135 designates the additional component which may be a standard commercial timer device for adjusting the time of duration of the flashtube. It comprises a housing 136 having a timing adjusting knob or knobs 137. This device contains its own power supply. It has a window 139, as shown in FIG. 10, through which the flash of light appears and may be observed through the opening 140. The housing of the component 135 may be made of plastic or the like, and it has within it a reflector 142 for reflecting the flash of light out through the window or panel 139.

The component 135 is connected to the microswitch 121 by leads, as designated at 144 and 145.

The operation of this embodiment of the invention will be readily understood and appreciated by those skilled in the art. When the ball 131 is struck by the golfer, movement will be imparted to the lever 125 to actuate the microswitch 121 so that a flash of light is produced by the component 135 which is visible to the player through the opening or aperture 140. The duration of the flash may be adjusted to a desired fraction of a second or other interval such that the flash of light for reinforcing and rewarding the player is only visible if he is looking directly at the ball 73 and opening 140 at the time of impact, that is the flash of light may be made short enough so that if the player has moved his head only slightly, the flash will not be visible to him.

From the foregoing, those skilled in the art will observe that the invention achieves and realizes all of the objects and advantages as outlined in the foregoing as well as having many additional advantages that are apparent from the detailed description. Exemplary preferred forms of the invention are described in detail herein, it being understood that the invention may be adapted in many other forms wherein it is desired to utilize and implement the psychological principle as described in the foregoing. The disclosure is intended to be representative of preferred forms of the invention and is intended to be illustrative of the invention rather than limiting thereon.

I claim:

1. In a training device for a sport wherein a freely projectable ball is struck with an implement:
   an implement having a predetermined surface area thereon adapted to be swung into contact with a ball;
   signal means associated with one of said ball and implement for producing a momentary flash of light closely adjacent said predetermined area and ball at the moment of impact; and
   means responsive to impact engagement between said area and ball to actuate said signal means, said flash of light being in the line of view of a person wielding said implement and looking at said ball at said monent of impact.

2. A device as defined in claim 1 wherein said implement comprises a baseball bat having a chamber therein inwardly of said predetermined area, said signal means being in said chamber and viewable through a window closely adjacent said area; said last-named means comprising an impact responsive switch in said chamber.

3. A device as in claim 1, including movable means normally supporting the ball in a position to have the implement brought into contact therewith and means responsive to movement of said support upon the ball being struck from its support by the implement to activate means causing the light to flash.

4. A training device as in claim 3 including adjustment means whereby the time duration of the flash of light can be adjusted.

References Cited

UNITED STATES PATENTS

| | | | |
|---|---|---|---|
| 1,876,657 | 9/1932 | Fox | 273—35 |
| 2,158,211 | 5/1939 | Aitken | 273—35 |
| 2,283,277 | 5/1942 | Modine | 273—186 |
| 2,335,280 | 11/1943 | Hogeberg | 273—201 |
| 3,009,704 | 11/1961 | Heard | 273—195 X |
| 3,122,365 | 2/1964 | August | 273—26 |

ANTON O. OECHSLE, *Primary Examiner.*

THEATRICE BROWN, *Assistant Examiner.*

U.S. Cl. X.R.

273—33, 183, 186